April 13, 1965   J. S. ZUCKERBRAUN   3,178,579
PHOTOSENSITIVE TUNING FORK SCANNER
Filed Nov. 23, 1960   3 Sheets-Sheet 1
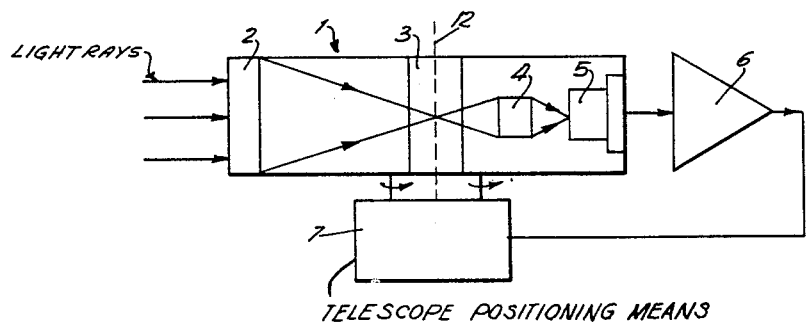
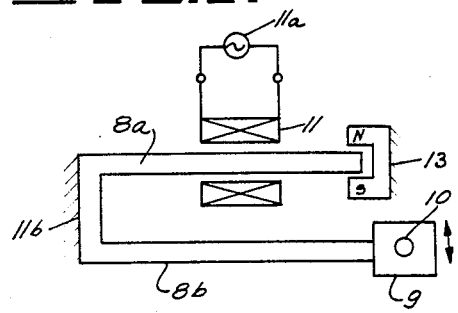
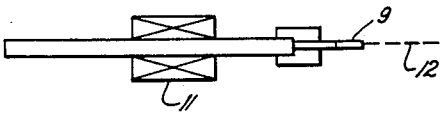
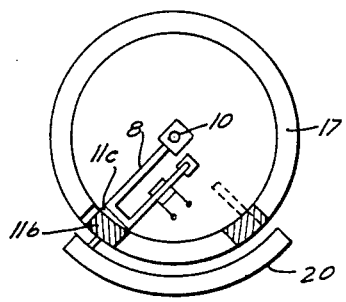
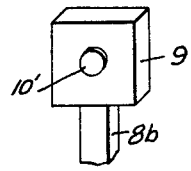
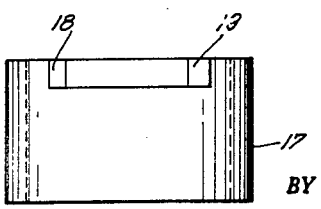
INVENTOR.
JACOB S. ZUCKERBRAUN
BY Ostrolenk, Faber,
Gerb + Soffen April 13, 1965  J. S. ZUCKERBRAUN  3,178,579
PHOTOSENSITIVE TUNING FORK SCANNER
Filed Nov. 23, 1960  3 Sheets-Sheet 2
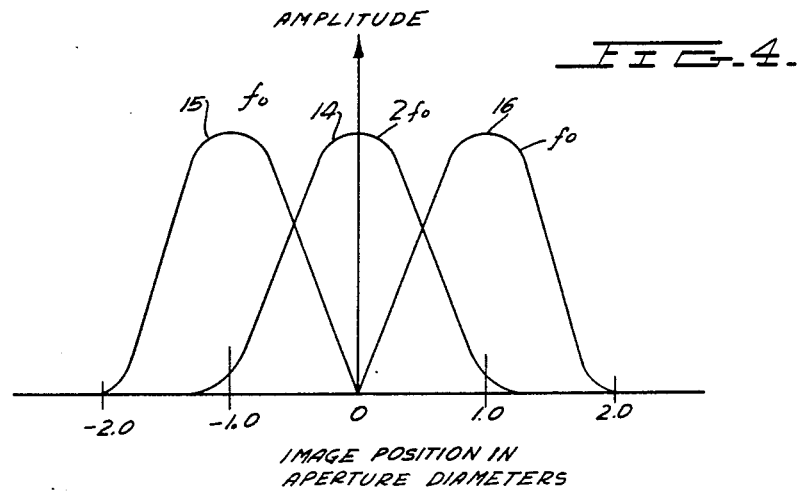
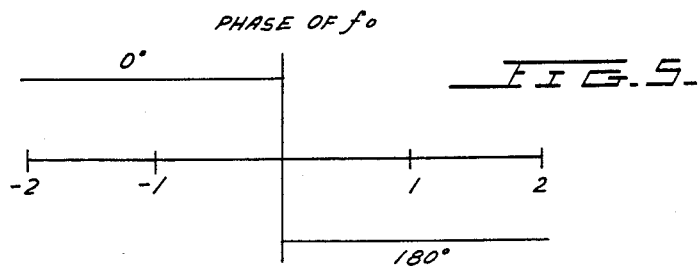
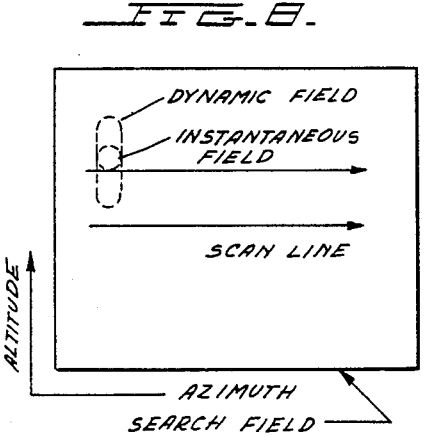
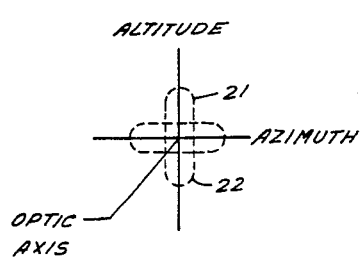
INVENTOR.
JACOB S ZUCKERBRAUN
BY April 13, 1965   J. S. ZUCKERBRAUN   3,178,579
PHOTOSENSITIVE TUNING FORK SCANNER Filed Nov. 23, 1960   3 Sheets-Sheet 3

INVENTOR.
JACOB S. ZUCKERBRAUN
BY Ostrolenk, Faber,
Gerb + Soffen

United States Patent Office 3,178,579
Patented Apr. 13, 1965

3,178,579
PHOTOSENSITIVE TUNING FORK SCANNER
Jacob S. Zuckerbraun, New York, N.Y., assignor to Kollsman Instrument Corporation, Elmhurst, N.Y., a corporation of New York
Filed Nov. 23, 1960, Ser. No. 71,248
15 Claims. (Cl. 250—203)

This invention relates to a light modulation system wherein the modulation means is operated by a tuning fork to serve as a shutter for light tracking devices.

The invention system is in the nature of an improvement of the shutter mechanism and light modulation system shown and described in U.S. Patent 2,905,828 in the name of O'Maley et al. for Light Tracking Device, and in U.S. patent application Serial No. 47,837, filed August 5, 1960, for Light Modulation System, both assigned to the same assignee as the present invention. A light tracking device is essentially utilized for navigational purposes and is provided with an optical system adapted to transmit an image of a celestial object such as stars, the sun or the moon to means which will seek to operate the optical system to maintain the image in the center of the field of view. The movements of the optical system may then be translated into corresponding movements of operating or adjusting members for craft guidance instruments or devices.

The background of the field of view is frequently illuminated in conjunction with the celestial body to be tracked. The aforesaid U.S. Patent 2,905,828 discloses a light tracking device having a double modulation system for the light impinging thereon, arranged to minimize errors caused by the background lighting. The double light modulating mechanism comprises a rotating disc having a raster of alternate opaque and transparent areas interrupting the field of view to the light sensitive medium, such as a photoelectric cell. A semi-circular shutter was used to further interrupt the light beam in the field of view at a lower frequency than that produced by the raster.

Such double modulation of the field of view substantially eliminates errors due to the background illumination entering the system in conjunction with light from the celestial body to be tracked. Circuit arrangements and means are provided in the referred to U.S. Patent 2, 905,- 828 to detect the directional information from the desired celestial body and translating such information as signals which automatically are effective in the light tracking device for predetermined orientations or operation.

In above noted co-pending application 47,837 an aperture is carried in a plate and is moved through the star image with simple harmonic motion, where the plate was carried by an electromagnetically driven reed. In accordance with the present invention, a similar scanning plate is carried by a tuning fork tine rather than a reed, the other tine of the fork being associated with some driving means. This type of structure provides a far more rigid mechanical system which renders the scanner relatively independent of deflection effects due to gravity, acceleration and set. Therefore, the null point is more accurately determined. Furthermore, it will be shown that the overall stability of the unit, when using a fork as the mounting means, is less dependent upon manufacturing accuracy of the mount, it being impossible to machine the mount and forks from a single piece of material. In a preferred embodiment of the invention, a single circular piece of material has an appropriately dimensioned central portion thereof cut out to define an inner opening in the cylindrical stock, having two forks projecting therefrom at right angles to one another. The adjacent tines of the two forks then receive plates having elongated apertures therein so positioned that the apertures are at 90° to one another and are normally positioned with their central portions intersecting one another. The opposite tine of each of the forks is then provided with some appropriate driving system, such as a magnetic system, for causing said opposite tine to oscillate so that the aperture plate bearing tine will similarly oscillate at the same fixed frequency.

Accordingly, the first aperture plate can be caused to first oscillate, to scan in a first direction (which could correspond to an azimuth axis), and the opposite oscillator plate may thereafter be caused to oscillate so that there will be scanning in the direction perpendicular to said first direction (which could correspond to an altitude axis). This scanning operation will proceed in substantially the same manner described in the above noted co-pending application 47,837, whereby the aperture defined by the intersection of the two slits will oscillate about some null position with sinusoidal displacement in a first direction and will thereafter be caused to similarly oscillate in a perpendicular direction. In either of the scanning directions the maximum excursion from the null position will be determined by the total excursion of the end of the plate-bearing fork tine and is preferably of the order of three-aperture diameters or more.

When a star image is to be tracked, where the star is a light source for the system, the star image when accurately located will be in a central position in the simple harmonic motion of the aperture. As the aperture is moved from side to side, the star image will be interrupted at twice the fork frequency. Thus, a beam of light may be directed at a photo-sensing device positioned behind the plate to generate a signal which is at twice the fork frequency. When, however, the star is moved away from the central position and along the line of oscillation, the light passing through the aperture and impinged upon the photo-sensing means will have a fundamental frequency component which is equal to that of the frequency of oscillation of the fork. If the star moves off the central position and in an opposite direction, the phase of this fundamental component will be reversed.

Therefore, the output signal of the photo-sensing means carries information as to whether the star is located exactly at a central position, or whether the star is displaced from a central position and the direction of its displacement. This information can then be applied to a servomechanism using the teachings of the above noted U.S. Patent 2,905,828 in order to alter the direction of the telescope receiving the star image to return the star image to its central or null position.

With the present novel scanner, it is therefore possible to combine the highly desirable feature of a very small instantaneous field which is swept by the aperture to limit noise due to background light, as well as the ability to develop a continuous tracking signal. Because of these properties, a novel scanner permits more efficient tracking of stars at night as well as during daylight hours and further permits tracking of the sun during daylight hours.

Since the signal generated is a periodic signal, rather than a pulse which has been heretofore produced, narrow-band amplifiers may be used at the output of the photo-sensing means to achieve a substantial decrease in the noise level.

Furthermore, the scanning mechanism is of an exceedingly simple construction and requires no motors or gear trains as have been required in the past. Along with this, the power requirement for driving the fork is exceedingly small and of the order of 0.5 milliwatt.

As an example of the effectiveness of the novel system, it has been possible to detect a second magnitude star in a background of 200 candles per square foot. In this experiment, the amplifiers used had a bandwidth of one cycle per second with the dynamic field swept by the aperture being approximately two by six minutes. The star image and plate aperture had a diameter of approximately four one thousandths of an inch which corresponds to a field of approximately 1.8 minutes. It was specifically possible with this apparatus to recognize Vega at an altitude of 40° with a signal to noise ratio of approximately 10, some fifteen minutes before sunset.

Accordingly, a primary object of this invention is to provide a novel scanning device for automatic light source locating instruments.

A further object of this invention is to provide a novel mounting means for the aperture plate of a light scanning device.

Another object of this invention is to provide a rugged mounting means for a driven aperture plate of a light tracking device.

Still another object of this invention is to provide a tuning fork having one tine mounting the aperture plate of a light scanning device and its other tine connected to be oscillated at a predetermined frequency.

These as well as other objects of my invention will become more apparent from the following description, illustrated in the drawings, in which:

FIGURE 1 shows a block diagram of a typical star tracker which can utilize the scanning means of the present invention.

FIGURE 2 shows a front view of a fork type scanner constructed in accordance with the present invention.

FIGURE 2a shows a modification of FIGURE 2.

FIGURE 3 is a top view of the fork scanner of FIGURE 2.

FIGURE 4 shows output voltages developed by the photo-sensing means when using the scanning device of the present invention.

FIGURE 5 shows the phasing of the fundamental signal output of the photo-sensing device when used with the scanner of the present invention.

FIGURE 6 shows a top view of a two axis scanning mechanism.

FIGURE 7 shows a side view of the bearing of FIGURE 6.

FIGURE 8 shows the search field, dynamic field and instantaneous field for operation of the two axis scanning mechanism of FIGURES 6, 7 and 11 when driven along a first of the axes.

FIGURE 9 shows the relation between the two dynamic fields swept by the device of FIGURES 6 and 7.

Figure 11:
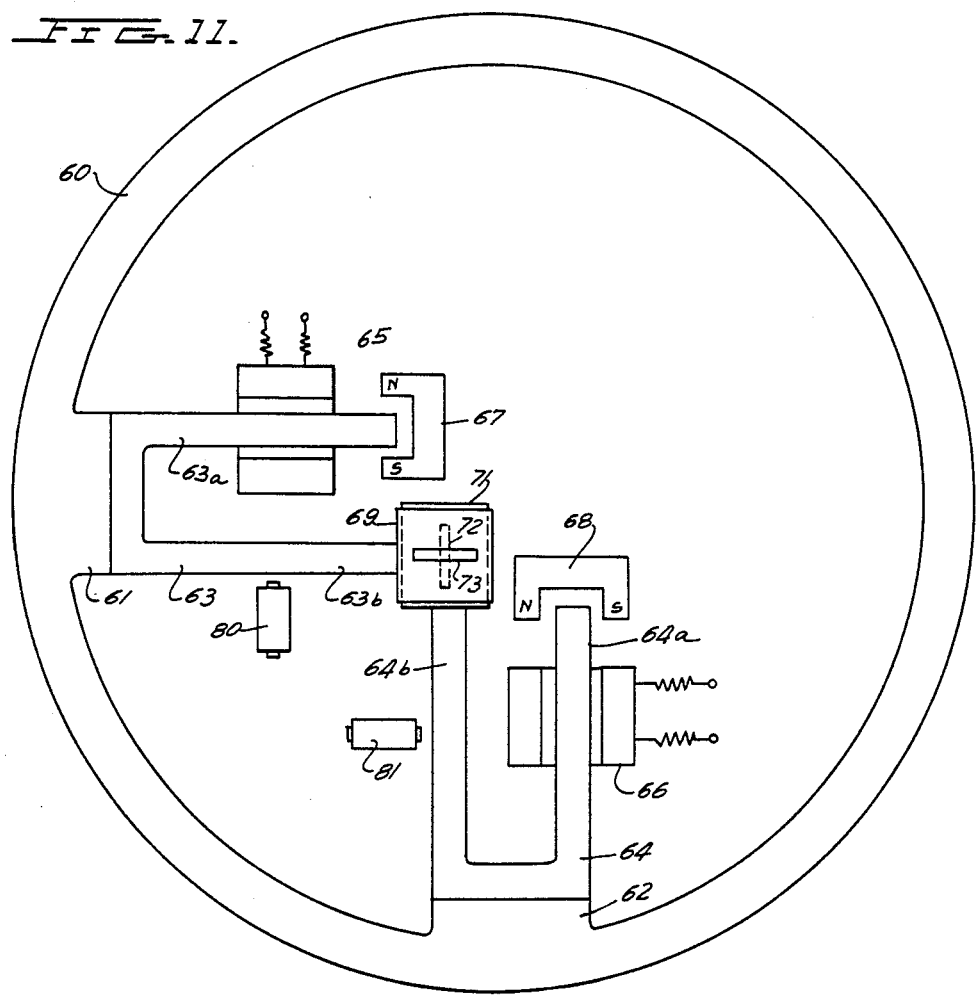
FIGURE 11 shows a preferred embodiment of the invention as a two-axis scanner wherein the tuning forks are formed integrally with the mounting structure.

Referring now to FIGURE 1, I show a schematic diagram of a light source tracking device where light rays from the celestial body to be tracked are collected by a telescope objective 2 of a telescope housing 1 and are focused on the proposed scanning mechanism 3. The scanning mechanism 3 modulates the light in a novel way to be described later.

The modulated light from the scanner 3 is collected by the condensing lens system 4 and is concentrated on a light sensing means or light detector 5 which can be a photomultiplier tube. The signal from the light sensing means 5 is amplified and processed by the narrow-band amplifier and circuitry 6 and then transmitted to the servomechanism 7. By means of these actuating signals, the servomechanism 7 guides the telescope housing 1 so that it aligns itself precisely with the star in altitude and azimuth.

The scanning mechanism 3 of the invention is described in more detail in FIGURES 2 and 3. Referring to FIGURES 2 and 3, the scanner is comprised of a tuning fork 8 having tines 8a and 8b. The tuning fork 8 is stationarily mounted at its base, as is schematically illustrated in FIGURE 2. Tine 8b of fork 8 carries a thin flat plate 9 at the end thereof which has a small centrally located aperture 10. When the tuning fork 8 is set into motion, tine 8b, and thus aperture 10, will move in the direction of the arrow shown in FIGURE 2, the frequency of oscillation of aperture 10 being adjusted at the resonant frequency of fork 8. It will be noted that the plane of motion of aperture 10 is in the focal plane 12 of telescope 1 of FIGURE 1. When the tine 8b is at rest, it will be further noted that aperture 10 is so located that its center is on the optical axis of telescope 1 of FIGURE 1. This position will hereinafter be referred to as the null or central position of the device.

In order to drive aperture plate 9, a driving system is provided which includes a driving coil 11 which is connectible to an A.C. source 11a at its terminals, as shown in FIGURE 2, and a U-shaped permanent magnet 13, which is fixedly mounted with respect to tine 8a and encloses the end of tine 8a as shown.

The driving coil 11 encloses tine 8a which is of a magnetizable material and the voltage of voltage source 11a is at a frequency which is preferably equal to the resonant frequency of tuning fork 8. Accordingly, when coil 11 is energized, the end of tine 8a is alternately made a north or south pole, so that it is alternately attracted and repelled from the upper north pole of permanent magnet 13. This oscillation of tine 8a will be transmitted to tine 8b so that aperture 10 will oscillate at the resonant frequency of tuning fork 8.

It is to be noted that the above described driving system could be replaced by other types of driving systems without departing from the scope of the invention, which is to mount the aperture plate 9 on a tuning fork, such as tuning fork 8, which is driven in any manner.

The driving coil 11 drives tine 8a when the coil is excited by the constant frequency voltage source 11a so that the adjacent tine 8b will vibrate with simple harmonic motion about its rest positon at the frequency of the A.C. source. The aperture 10, therefore, will be given a sinusoidal displacement about the null position at the frequency of the fork 8 oscillation. Clearly, if the excitation current to driving coil 11 is at the resonant frequency of the fork, very little power will be required to keep the fork in continuous oscillation.

In operation, when the star image is focused at the null position, as the aperture vibrates, the star radiation will be interrupted twice during each cycle of the fork, causing a periodic signal to be developed by the light sensor. The fundamental component of this signal is equal to twice the fork frequency, and is shown on curve 14 in FIGURE 4. Curve 14, in FIGURE 4, shows the amplitude of the second harmonic ($2f_0$) as a function of the image position for a constant image intensity. This signal is used to indicate that the star is lined up precisely with the telescope axis.

If the star is now moved off null along the line of vibration, then a periodic signal having a fundamental component equal to the fork frequency will be developed as shown by curve 15 of FIGURE 4. This fundamental component gradually increases in amplitude from zero to a maximum and then decreases again as the star departs further from null. If the star image is moved off null in a direction opposite to that described, the amplitude variations will be as before, as shown in curve 16 of FIGURE 4, but the phase of the fundamental will reverse. The phase relationship of the outputs of curves 15 and 16 of FIGURE 4 is given in FIGURE 5 which shows phase on the vertical axis as compared to image position on the horizontal axis plotted in aperture diameters. Therefore, these signals can be used to servo the telescope 1 by servo 7 as well as for recognition.

From the above it is seen that the motion of aperture 10 establishes a single axis along which a star can be tracked to null. Since two axes at right angles to each other are generally desirable, the basic concept of a vibrating scanning aperture can be expanded to two axes. A first embodiment of a two axes device is shown in FIGURES 6 and 7 where a bearing 17 has two stop faces 18 and 19 located 90° apart.

In FIGURE 6 the fork 8 together with its exciting coil are of the type described in FIGURES 2 and 3 and are supported so that they can be rotated along the bearing surface from one stop to the other, as by a solenoid-operated mechanism 20, which can be of any desired nature and carries mounting base 11b of the fork 8. It is to be noted further that an angular shaped shim 11c is interposed between fork 8 and mounting base 11b so that aperture 10 will fall at the center of bearing 17. Thus, when the base 11b is rotated to the bottom line position, aperture 10 will continue to have its null position at the center of bearing 17. Clearly, when the scanning mechanism is located against face 18, the aperture 10 can establish an azimuth axis when it is oscillated and when the mechanism is located against face 19, the aperture motion will establish an altitude axis.

With the device of FIGURES 6 and 7, the tracking of a star may be accomplished by alternately tracking in altitude and azimuth. The tracking process will then be programmed as follows: the base 11b is positioned in the solid line position of FIGURE 6 by the solenoid mechanism 20 so that the aperture vibrates along the altitude axis. This is shown in FIGURE 8 where the instantaneous field of aperture 10 sweeps a dynamic field within a search field. At the same time, the telescope positioning servo 7 of FIGURE 1 causes the telescope 1 of FIGURE 1 to sweep in azimuth along the scan lines of FIGURE 8 through an angle equal to the width of the search field. Once the recognition signal is generated, the search stops, and alternate tracking in altitude and azimuth commences as shown in FIGURE 9 where aperture 10 first sweeps the altitude dynamic field 21 with base 11 of FIGURE 6 in its solid line position and then sweeps the azimuth dynamic field 22 of FIGURE 9 with base 11b of FIGURE 6 in its dotted line position. The same process given above applies to sun and moon tracking except that the fork excitation is increased to produce a dynamic field somewhat larger than the image of the celestial body.

As an alternative to the use of oscillating aperture, a small semi-conductor photocell may be used in place of the aperture. Thus, as shown in FIGURE 2a, a suitable photocell 10' can be carried by plate 9. In this case, when the fork vibrates, the photocell, having an effective area equal to the aperture previously described, will scan the field in an oscillatory manner as before. This eliminates the condensing lens system 4 and the photomultiplier tube 5, together with any possible cathode gradient effects. The form of the signals derived will remain as indicated in FIGURES 4 and 5 so that associated circuit components remain essentially unchanged.

Figure 10:
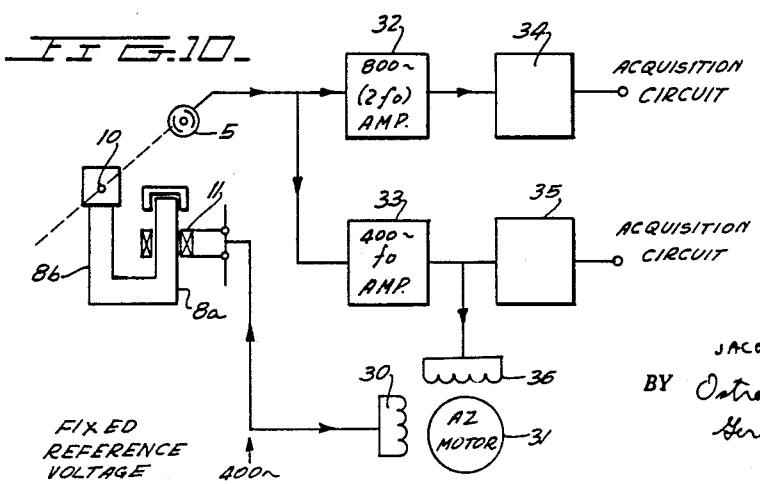
FIGURE 10 is a line diagram showing the azimuth portion of the electrical circuitry of a device having the scanning mechanism of FIGURES 6 and 7.

The electrical circuitry for use with the method of star tracking proposed for the scanners of FIGURES 6 and 11 is schematically shown in FIGURE 10 where, for simplicity, only the azimuth loop is shown.

Referring now to FIGURE 10, a 400 cycle input voltage is connected to drive coil 11 for oscillating tine 8a and thus tine 8b (fork 8 being presumed to have a resonant frequency of 400 cycles per second) and is also connected to a fixed field winding 30 of azimuth control motor 31 of the servomechanism 7 of FIGURE 1. As aperture 10 is swept through its field, the light transmitted thereby is impinged on the light sensing means 5 shown, for example, as a photomultiplier in FIGURE 10, which can be of the type 1P21. The output of photomultiplier 5 is connected to an 800 cycle tuned amplifier 32 and a 400 cycle tuned amplifier 33. The outputs of these two amplifiers are connected to acquisition control circuits 34 and 35, respectively, which have outputs connected in any desired manner to drive the servomechanism elements in order to maintain the 800 cycle double frequency output of tube 5. That is, the servo motor is driven by amplifier 33 and acquisition controls 34 and 35 are used to start and stop search, and to indicate star presence. Acquisition circuits of this type are well known to the art and are typically shown in U.S. Patent 2,713,134. When output in circuit 35 is zero but output of circuit 34 is present this is the condition that the star is exactly at null. This of course, will be the output frequency of photomulplier tube 5 when the star image is at a null position or a central position since tine 8b is oscillated at a frequency of 400 cycles.

The 400 cycle amplifier 33 will receive signals when the star image moves off the null position as has been described previously. The amplifier 33 is, therefore, connected to control field winding 36 of servo motor 31 where this winding will be energized by an excursion of the star image from null, the phase of the energization being dependent upon the sense of the excursion.

Accordingly, azimuth control motor 31 will operate to reposition the azimuth of telescope 1 of FIGURE 1 to maintain the proper azimuth angle for retaining the star image at null.

In the event that aperture 10 is replaced by a semiconductor type of photosensing element, it is clear that the output of the element is directly connected to amplifiers 32 and 33, the operation being identical to that described above.

It will be further apparent that the altitude control system will be identical to that described in FIGURE 10 for the azimuth control system.

The following advantages flow from the use of my novel scanning mechanism. These advantages are listed as follows:

(1) The device allows the use of a scanning aperture equal to the star image diameter. This results in a maximum photon signal-to-noise ratio.

(2) The device produces a periodic star signal, thereby permitting the use of narrow-band amplifiers to reduce the noise fluctuations in the signal.

(3) The signals developed by the scanner are suitable for continuous positioning and recognition.

(4) Background modulation caused by sky and phototube gradients are kept low because the aperture motion is very small.

(5) The scanner itself cannot generate a spurious background signal because the aperture presents a fixed area to the background illumination.

(6) The scanning mechanism does not require the use of motors or gears and therefore has a very long life. This minimizes weight and keeps the power requirements to less than 500 microwatts.

(7) The dynamic field can be from three to four times the instantaneous field of the aperture, thus permitting fewer search lines than for a non-vibratory scanning aperture.

(8) The accuracy of tracking is high because star signals are generated within the airy disc of the star image, and the aperture position can be more accurately controlled than in a rotary device.

(9) The electronics associated with the scanner tends to be simple. The star signal can be a 400 cycle signal either 90° or 270° out of phase with the servo motor reference, depending upon the star position with respect to null. Therefore, the tracking motors operate as synchronous detectors for star positioning.

The preferred embodiment of the invention is shown in FIGURE 11, wherein the aperture plates are provided with intersecting elongated slits which define at their intersection a square-shaped aperture which is moved in either an azimuth axis or an altitude axis, depending upon which of the forks is oscillated.

Referring now to FIGURE 11, circular plate 60 has the central portions thereof machined so that its inner circumference is left with protrusions 61 and 62. Tuning forks 63 and 64 are then secured to protrusions 61 and 62, respectively, each of tuning forks 63 and 64 being of the type described in FIGURES 2 and 3. Thus, tuning fork 63 is provided with a drive coil 65, while tuning fork 64 is provided with a drive coil 66, each of the drive coils being connectible to some A.C. voltage source.

It will be noted that in FIGURE 11 the drive coils 65 and 66 are stationarily mounted in any desired manner (not shown) with respect to their respective tuning forks, so that they will not impose an additional load on the fork, and tines 63a and 64a will oscillate independently of the mass of coils 65 and 66. Each of tines 63a and 64a are then received by U-shaped permanent magnets 67 and 68, respectively, which are fixedly mounted with respect to tines 63a and 64a, respectively, in any desired manner (not shown). By way of example, all of drive coils 65 and 66 and permanent magnets 67 and 68 may be mounted to the same stationary member which can be secured to mounting block 60.

The end of tine 63b is terminated by an aperture plate 69 which has an elongated slot 70 therein. In a like manner, tine 64b is terminated with an aperture plate 71 which has an elongated aperture slot 72 therein positioned at right angles to slot 70. The two plates 69 and 71 are similar to plate 9 of FIGURES 2 and 3, it being understood that these two thin plates lie in spaced parallel planes to one another. Accordingly, the two aperture plates 69 and 71 define a square-shaped aperture at the intersection of slots 70 and 72.

The operation of the device of FIGURE 11 is similar to that described above for FIGURE 6, wherein tine 63b is first caused to oscillate so that the square-shaped aperture in effect oscillates along a vertical line for defining an altitude axis and thereafter tine 64b is caused to oscillate with the square-shaped aperture moving along a horizontal axis to define an azimuth axis. Clearly, however, in the embodiment of FIGURE 11 there is no necessity for repositioning the tuning fork structure as is necessary in FIGURE 6.

In the preferred embodiment of the invention, for use in daylight tracking, the width of each of slots 70 and 72 is approximately one star image diameter, while the length of slots 70 and 72 may be approximately 7 diameters. The clearance between plates 69 and 71 can be approximately 3/1000 of an inch. While in the preferred mode of operation of the device there is a first azimuth scanning and a second altitude scanning, it will be apparent that since the plates 69 and 71 can be independently controlled, other scanning patterns appropriate to the aperture dimensions and tracking application can be readily produced. When driven in the preferred mode, however, a switching circuit, which causes operation of only drive coil 65 and thereafter only energization of drive coil 66, is preferably utilized, as described in above noted co-pending application 47,837.

If desired, feedback coils 80 and 81 can be positioned adjacent tines 63b and 64b, respectively, to generate voltages in accordance with the motion of tines 63b and 64b, respectively. These voltages can then be used as negative feedback to oscillator circuits driving coils 65 and 66, respectively, to stabilize the amplitude of the tine vibration under variable temperature conditions. Conversely, the coils could be used in a positive feedback circuit so that the forks go into self-excitation with their amplifier to eliminate the need for an external oscillator.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A scanning device for light source tracking devices; said scanning device comprising a plate having an aperture therein and a driving means connected to said plate for moving said plate in simple harmonic motion about a central position; said tracking device including means for directing an image of a light source to be tracked by said scanning device toward said plate and a light sensing means; said means for directing said image of said light source being angularly movable with respect to said light source; said plate being interposed between the light source being tracked and said image directing means; said driving means moving said aperture along a line to cause intermittent registry with said image of said light source to permit intermittent impingement of light on said light sensing means; said driving means including a tuning fork having said plate connected to a tine thereof.

2. The scanning device of claim 1 wherein said aperture has substantially the same size as the size of said image.

3. The scanning device of claim 2 wherein said driving means moves said plate in a total excursion of at least three diameters of said image.

4. The scanning device of claim 1 wherein the other tine of said tuning fork has an operating means connected thereto for moving said last mentioned tine with simple harmonic motion.

5. The scanning device as set forth in claim 4 wherein said last mentioned tine is positioned within a uniform magnetic field; said operating means comprising an electromagnetic winding for rendering the end of said last mentioned tine positioned within said uniform magnetic field an alternately north and south pole.

6. The scanning device of claim 1 wherein said light sensing generates a signal at twice the frequency of oscillation of said plate when said image is at said central position.

7. The scanning device of claim 3 wherein said light sensing means generates a signal at twice the frequency of oscillation of said plate when said image is at said central position.

8. The scanning device of claim 7 wherein said light sensing means generates a signal having the fundamental frequency of oscillation of said plate as a component thereof when said image is displaced from said central position.

9. The scanning device of claim 8 wherein the phase of said fundamental frequency is dependent upon the sense of the displacement of said image from said central position.

10. The device of claim 9 which includes servo-mechanism means having the output of said light sensing means as an input signal; said servo-mechanism means being connected to said means for directing said image and varying the direction of said image to retain said image at said central position.

11. A scanning device for light source tracking devices; said scanning means comprising a photosensitive device and a driving means connected to said photosensitive device for driving said photosensitive device with simple harmonic motion; said tracking device including means for directing an image of the light source to be tracked by said scanning device toward said photosensitive device; said photosensitive device having an excursion of at least three diameters of said image; said driving means including a tuning fork having said photosensitive device mounted on one tine thereof.

12. A scanning device for light source tracking devices; said scanning device including a first plate and a second plate; each of said first and second plates having slots therein; a first and second tuning fork, each of said first and second tuning forks having first and second tines; each of said first and second plates being secured to the end of said first tines of said first and second tuning forks, respectively; a driving means for each of said first and second tuning forks; said driving means being connected to said second tine of said first and second tuning forks, respectively, for moving said first and second plates in simple harmonic motion about a central position; said slots of said first and second plates being positioned at an angle with respect to one another and intersecting one another when each of said plates are in their said central position.

13. A scanning device for light source tracking devices; said scanning device including a first plate and a second plate; each of said first and second plates having slots therein; a first and second tuning fork, each of said first and second tuning forks having first and second tines; each of said first and second plates being secured to the end of said first tines of said first and second tuning forks, respectively; a driving means for each of said first and second tuning forks; said driving means being connected to said second tine of said first and second tuning forks, respectively, for moving said first and second plates in simple harmonic motion about a central position; said slots of said first and second plates being positioned at an angle with respect to one another and intersecting one another when each of said plates are in their said central position; each of said first and second tuning forks being mounted to a common mounting structure.

14. A scanning device for light source tracking devices; said scanning device including a first plate and a second plate; each of said first and second plates having slots therein; a first and second tuning fork, each of said first and second tuning forks having first and second tines; each of said first and second plates being secured to the end of said first tines of said first and second tuning forks, respectively; a driving means for each of said first and second tuning forks; said driving means being connected to said second tine of said first and second tuning forks, respectively, for moving said first and second plates in simple harmonic motion about a central position; said slots of said first and second plates being positioned at an angle with respect to one another and intersecting one another when each of said plates are in their said central position; each of said first and second tuning forks being mounted to a common mounting structure; said common mounting structure being comprised of a cylindrical body; said tuning forks being carried from said cylindrical body and extending toward the central portion thereof; said tuning forks being 90° displaced from one another.

15. In the device as set forth in claim 11, wherein said tuning fork is movable from a first position to a second position, whereby said aperture scans said image in a first and second direction.

References Cited by the Examiner
UNITED STATES PATENTS

| | | | |
|---|---|---|---|
| 1,523,149 | 1/25 | Wheeler | 250—232 X |
| 1,565,596 | 12/25 | Snook | 250—232 X |
| 1,631,021 | 5/27 | Dowling | 250—232 |
| 1,951,666 | 3/34 | Martin | 250—232 X |
| 2,070,178 | 2/37 | Pottenger et al. | 250—203 |
| 2,398,552 | 4/46 | Norton | 250—237 X |
| 2,489,305 | 11/49 | McLennan | 250—219.1 X |
| 2,625,659 | 1/53 | Mendelson | 250—232 X |
| 2,795,736 | 6/57 | Dilks | 250—232 X |
| 2,899,564 | 8/59 | Rabinow et al. | 250—203 X |
| 2,966,823 | 1/61 | Trimble | 250—203 X |

RALPH G. NILSON, *Primary Examiner.*

WALTER STOLWEIN, RICHARD M. WOOD,
*Examiners.*